US008068834B2

(12) United States Patent
Amerga et al.

(10) Patent No.: US 8,068,834 B2
(45) Date of Patent: Nov. 29, 2011

(54) INTRA-FREQUENCY, INTER-FREQUENCY AND INTER-RADIO ACCESS TECHNOLOGY SEARCHING FOR NEIGHBOR CELLS WITHIN A FIXED TIME DURATION

(75) Inventors: Messay Amerga, San Diego, CA (US); Sudhir Halbhavi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2094 days.

(21) Appl. No.: 10/650,146

(22) Filed: Aug. 27, 2003

(65) Prior Publication Data

US 2004/0116110 A1 Jun. 17, 2004

Related U.S. Application Data

(60) Provisional application No. 60/406,455, filed on Aug. 27, 2002.

(51) Int. Cl.
 *H04W 36/00* (2009.01)
(52) U.S. Cl. ........................................ 455/436; 455/423
(58) Field of Classification Search .................. 455/574, 455/437, 434, 442, 436, 439, 423
 See application file for complete search history.

(56) References Cited

U.S. PATENT DOCUMENTS

| | | | |
|---|---|---|---|
| 5,436,956 A | 7/1995 | Shiotsuki et al. | |
| 5,790,589 A | 8/1998 | Hutchison, IV et al. | |
| 5,854,981 A * | 12/1998 | Wallstedt et al. | 455/439 |
| 5,946,621 A * | 8/1999 | Chheda et al. | 455/440 |
| 5,987,012 A | 11/1999 | Bruckert et al. | |
| 6,067,460 A | 5/2000 | Alanara et al. | |
| 6,073,021 A * | 6/2000 | Kumar et al. | 455/442 |
| 6,073,035 A | 6/2000 | Witter | |

(Continued)

FOREIGN PATENT DOCUMENTS

JP 10191428 7/1998

(Continued)

OTHER PUBLICATIONS

Translation of Office Action in Japanese application 2010-232556 corresponding to U.S. Appl. No. 10/317,385, citing JP2000102057, JP10191428, JP11113042 and WO0237868 dated Feb. 1, 2011.

*Primary Examiner* — Tu Nguyen
(74) *Attorney, Agent, or Firm* — Peter A. Clevenger

(57) ABSTRACT

Techniques for searching neighbor cells within a fixed time duration are disclosed. In one embodiment, cells in a monitored list are ranked. A first subset of the ranked cells are searched during each cycle in a series of cycles, and a subset of the remainder of ranked cells is searched in each cycle, the subset varying from cycle to cycle. In another embodiment, the ranking and searching of a subset of the ranked list of cells is performed when the number of monitored cells is greater than a pre-determined search number. In yet another embodiment, the complete list of monitored cells is searched when the number of monitored cells is less than or equal to a pre-determined search number. In various embodiments, the searching comprises one or more of intra-frequency, inter-frequency, or inter-RAT searching. Various other embodiments are also presented. Benefits include allowing prescribed levels of intra-frequency, inter-frequency and/or inter-RAT search to be performed allowing for improved base station selection and therefore improved performance and system capacity.

18 Claims, 9 Drawing Sheets

U.S. PATENT DOCUMENTS

| | | | |
|---|---|---|---|
| 6,134,440 A * | 10/2000 | Black | 455/436 |
| 6,195,551 B1 | 2/2001 | Kim et al. | |
| 6,205,193 B1 * | 3/2001 | Solve et al. | 375/354 |
| 6,360,098 B1 | 3/2002 | Ganesh et al. | |
| 6,535,738 B1 * | 3/2003 | Bomar et al. | 455/436 |
| 6,535,752 B1 | 3/2003 | Dent | |
| 6,542,741 B2 * | 4/2003 | Wallstedt et al. | 455/434 |
| 6,556,834 B1 | 4/2003 | Kobayashi et al. | |
| 6,606,490 B1 | 8/2003 | Rainish et al. | |
| 6,799,030 B2 | 9/2004 | Barber et al. | |
| 7,089,004 B2 * | 8/2006 | Jeong et al. | 455/436 |
| 2001/0031638 A1 | 10/2001 | Korpela et al. | |
| 2002/0025811 A1 | 2/2002 | Willey | |
| 2002/0032032 A1 * | 3/2002 | Haumont et al. | 455/436 |
| 2002/0102976 A1 | 8/2002 | Newbury et al. | |
| 2002/0187780 A1 * | 12/2002 | Souissi | 455/426 |
| 2002/0197992 A1 | 12/2002 | Nizri et al. | |
| 2003/0045241 A1 * | 3/2003 | Noerpel et al. | 455/67.1 |
| 2003/0153370 A1 | 8/2003 | Sako | |
| 2004/0033805 A1 | 2/2004 | Verma et al. | |
| 2004/0147262 A1 * | 7/2004 | Lescuyer et al. | 455/434 |

FOREIGN PATENT DOCUMENTS

| | | |
|---|---|---|
| JP | 11113042 | 4/1999 |
| JP | 2000102057 | 4/2000 |
| JP | 2002232929 A | 8/2002 |
| JP | 2004534412 | 11/2004 |
| WO | WO0120942 | 3/2001 |
| WO | WO0167788 A2 | 9/2001 |
| WO | WO0207459 A2 | 1/2002 |
| WO | WO0237868 A2 | 5/2002 |

* cited by examiner

INTRA-FREQUENCY, INTER-FREQUENCY AND INTER-RADIO ACCESS TECHNOLOGY SEARCHING FOR NEIGHBOR CELLS WITHIN A FIXED TIME DURATION

CROSS REFERENCE TO RELATED APPLICATIONS

This application claims priority to U.S. Provisional Application Ser. No. 60/406,455 filed Aug. 27, 2002.

This application is also related to the following co-pending and commonly assigned patent applications, U.S. application Ser. No. 10/317,385, entitled LIMITING CELL RESELECTION BASED ON PILOT POWER, filed Dec. 12, 2002, and U.S. application Ser. No. 10/318,695, entitled IDLE MODE CELL REACQUISITION AND RESELECTION, filed Dec. 12, 2002, all of which applications are incorporated by reference herein.

FIELD

The present invention relates generally to wireless communications, and more specifically to searching for neighbor cells within a fixed time duration.

BACKGROUND

Wireless communication systems are widely deployed to provide various types of communication such as voice and data. These systems may be based on code division multiple access (CDMA), time division multiple access (TDMA), or some other multiple access techniques. A CDMA system provides certain advantages over other types of systems, including increased system capacity.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in "TR-45.5 Physical Layer Standard for cdma2000 Spread Spectrum Systems" (the IS-2000 standard), and (4) some other standards. An example non-CDMA system is the GSM system.

Neighboring systems may employ one or more radio access technologies on one or more frequencies. Furthermore, a system may have one radio access technology overlaying another. For example, portions of a GSM system may be overlapped with W-CDMA base stations. It may be desirable for a mobile station communicating on the W-CDMA system to handoff to the GSM system without dropping an active call.

To facilitate such handoff, and to maintain a call on a serving system, a mobile station may be required to periodically search for base stations on alternate frequencies and/or alternate radio access technologies while searching on the serving frequency as well. The W-CDMA specification, for example, provides for a compressed mode, in which gaps in transmission and reception on a serving frequency are introduced, allowing the mobile station to switch frequencies and perform measurements or searching on an alternate frequency while maintaining an active call. However, frequency discontinuity may interfere with a search that is being performed on the serving frequency.

To maintain communication performance on the serving frequency, intra-frequency searching of a minimum level should be maintained. At the same time, overall communication performance requires inter-frequency or inter-Radio Access Technology (inter-RAT) measurements to allow for inter-frequency or inter-RAT handoff, when necessary. Minimum periods between intra-frequency and inter-frequency searches may be prescribed for a system. In addition, or alternately, performance requirements may be prescribed without specifying the search procedure to be performed. The number of cells that a mobile station is able to detect may vary based on the location of the mobile station within the system and the corresponding channel conditions between the various neighbor cells and the mobile station. A mobile station may have a fixed amount of time available to periodically monitor detected cells, including inter-frequency, intra-frequency, and inter-RAT cells. Although the fixed amount of time for searching during subsequent periods may vary, during some periods the time required to search the detected cells for monitoring may exceed the fixed time available.

The performance of a system, including throughput as well as system capacity, relies in part on efficient use of available base stations, including intra-frequency, inter-frequency, and inter-RAT base stations. Thus, searching the detected cells indicated for monitoring should be performed such that any prescribed minimum search periods and/or performance requirements are met utilizing the search time allotted. There is therefore a need in the art for searching neighbor cells within a fixed time duration.

SUMMARY

Neighbor cells are searched within a fixed time duration. In one embodiment, cells in a monitored list are ranked. A first subset of the ranked cells are searched during each cycle in a series of cycles, and a subset of the remainder of ranked cells is searched in each cycle, the subset varying from cycle to cycle. In another embodiment, the ranking and searching of a subset of the ranked list of cells is performed when the number of monitored cells is greater than a pre-determined search number. In yet another embodiment, the complete list of monitored cells is searched when the number of monitored cells is less than or equal to a pre-determined search number. In various embodiments, the searching comprises one or more of intra-frequency, inter-frequency, or inter-RAT searching. Various other embodiments are also presented. Benefits include allowing prescribed levels of intra-frequency, inter-frequency and/or inter-RAT search to be performed allowing for improved base station selection and therefore improved performance and system capacity.

DETAILED DESCRIPTION

Figure 1:
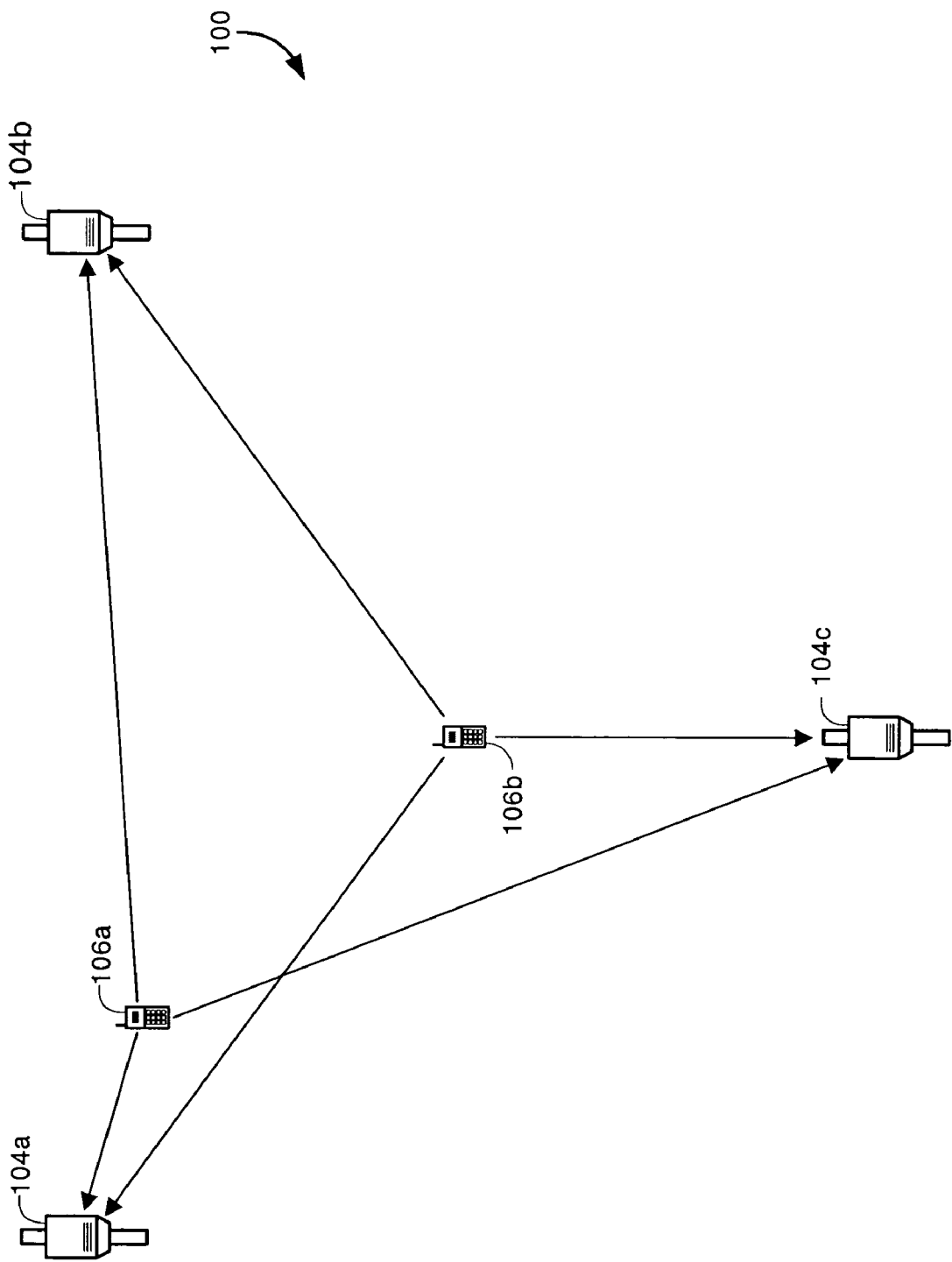
FIG. 1 is a general block diagram of a wireless communication system shown to support a number of users.

FIG. 1 is a diagram of a wireless communication system 100 that may be designed to support one or more CDMA standards and/or designs (e.g., the W-CDMA standard, the IS-95 standard, the cdma2000 standard, the HDR specification). System 100 may also deploy any wireless standard or design other than a CDMA system, such as a GSM system. In an example embodiment, system 100 may contain base stations conforming to the W-CDMA standard as well as the GSM standard.

For simplicity, system 100 is shown to include three base stations 104 (labeled 104a, 104b, 104c) in communication with two mobile stations 106 (labeled 106a and 106b). The base station and its coverage area are often collectively referred to as a "cell". In IS-95 systems, a cell may include one or more sectors. In the W-CDMA specification, each sector of a base station and the sector's coverage area is referred to as a cell. As used herein, the term base station can be used interchangeably with the terms access point or nodeB. The term mobile station can be used interchangeably with the terms user equipment (UE), subscriber unit, subscriber station, access terminal, remote terminal, or other corresponding terms known in the art. The term mobile station encompasses fixed wireless applications.

Depending on the CDMA system being implemented, each mobile station 106 may communicate with one or more base stations 104 on the forward link at any given moment, and may communicate with one or more base stations on the reverse link depending on whether or not the mobile station is in soft handoff. The forward link (i.e., downlink) refers to transmission from the base station to the mobile station, and the reverse link (i.e., uplink) refers to transmission from the mobile station to the base station.

For clarity, the examples used in describing this invention may assume base stations as the originator of signals and mobile stations as receivers and acquirers of those signals, i.e. signals on the forward link. Those skilled in the art will understand that mobile stations as well as base stations can be equipped to transmit data as described herein and the aspects of the present invention apply in those situations as well. The word "exemplary" is used exclusively herein to mean "serving as an example, instance, or illustration." Any embodiment described herein as "exemplary" is not necessarily to be construed as preferred or advantageous over other embodiments.

Cell selection is the process that allows a mobile station to select a suitable cell of a particular system. A mobile station first accesses a system (during power-up, for example), and selects a base station, or serving cell, with which to establish communication, in accordance with certain cell selection conditions. A mobile station may be in idle mode, that is, without an active call or data session in progress. In idle mode, the mobile station can intermittently monitor the serving cell to, among other things, determine if an incoming call is being directed to the mobile station. In a typical wireless communication system, a mobile station will maintain communication with, or "camp" on, a single cell while in idle mode. Periodically, a mobile station may monitor the serving cell to determine if the selection conditions are still being met. During idle mode, the mobile station may progress through any number of sleep cycles. A portion of the sleep cycle is spent asleep, or in low-power mode, during which time signal reception is discontinued and various components of the mobile station are powered off or put in a low-power state. During the sleep cycle, the mobile station wakes up, reacquires the serving cell (if it is available), and performs the required monitoring.

In addition, surrounding base stations can be monitored to determine if the mobile station should attempt to reselect to another cell. Cell reselection is the process that allows the mobile station to detect and camp on a more "suitable" cell than the current serving cell. Cell reselection is a term used in the W-CDMA standard, and the process is similar to idle handover in IS-95 or IS-2000 systems. In each of these three exemplary systems, cell selection and reselection is autonomously completed by the mobile station. Thus, a mobile station can roam in and between various systems, updating the current serving cell as appropriate, with a minimal amount of signaling required between the mobile station and the various cells or base stations within the systems.

A mobile station commonly maintains various lists of base stations or cells in and around its current location. An active set is the set of cells with which the mobile station is communicating. It is common for the active set to contain only a single cell, the serving cell, while the mobile station is in idle mode, although the active set can contain any number of cells within the scope of the present invention. A list of neighboring cells may be kept in a neighbor list. A set of cells that should be periodically monitored, for example, when the serving cell no longer meets the selection conditions, can be kept in a monitored list. Various techniques for determining active sets, neighbor lists, monitored lists, and the like are well known in the art, and any such technique can be deployed within the scope of the present invention.

In FIG. 1, a mobile station 106 may be operable with one or more communication systems 100, conforming to one or more standards, examples of which are given above. A system standard commonly provides requirements for cell selection, reselection and the like. In some cases, procedures are not specified directly, but performance criteria are set forth that must be adhered to by base stations or mobile stations within the system. An example cell selection procedure conforming to the W-CDMA standard, and operable with multiple system formats (including W-CDMA and GSM) is detailed below with respect to FIG. 6. However, the principles of the present invention are not limited to W-CDMA systems, and can be applied to any communication system.

It is typically desirable for a mobile station to minimize power consumption, which yields increased standby or "talk" times for a given battery configuration, or allows a reduced cost and/or smaller battery. For the purpose of discussion, the embodiments herein are described in the context of idle mode operation, a mode in which low power operation is desirable. In the exemplary W-CDMA embodiment, serving cell reacquisition, neighbor cell monitoring, and cell reselection may occur during idle mode. Active mode operation may provide for cell handoff according to a different set of procedures. However, this distinction is for clarity of discussion only. Those of skill in the art will readily adapt the principles disclosed herein to any system or mode in which maximizing the duration of the low-power state is desirable.

In the example W-CDMA embodiment, a mobile station can enter "sleep" mode, which can be interchanged with the term idle mode. In sleep mode, the mobile station sequences through one or more Discontinuous Reception (DRX) cycles until the mobile station receives or initiates an incoming call or data transmission. During each DRX cycle, the mobile station goes to sleep, discontinuing reception, and disabling as much circuitry as possible to achieve a low power state. For example, radio frequency (RF) and baseband processing components may be shut off during this time. During each DRX cycle, the mobile station "wakes up" to reacquire and monitor the current serving cell. The mobile station may need to search for and locate the serving cell if the communication channel has changed or the timing between the base station and mobile station has drifted. Examples of this process are described in further detail below. The serving cell may be measured to determine if the selection conditions are still being met. Periodically, the monitored set may need to be searched to determine if reselection is in order. Once the current serving cell is located, the mobile station can monitor the serving cell (for example, a paging channel), and return to sleep for the next DRX cycle if active communication is not required. If additional neighbor monitoring or cell reselection is required, additional time may be required. Reducing the portion of a DRX cycle during which a mobile station must remain awake allows for a corresponding savings in power. Therefore it is desirable to wake up no sooner than required to reacquire the serving cell and receive the paging channel. An example embodiment is described below in which a subset of possible searching is performed prior to receiving a page indicator. When that search subset results in successful acquisition, the page indicator can be received, and the mobile station can reenter the sleep state soon thereafter, when applicable. When the initial search subset does not result in successful acquisition, or when additional searching is desired (such as neighbor cell monitoring), the mobile station may need to remain awake for additional time. It may be desirable to limit the amount of time allocated for such monitoring, to reduce the amount time spent in the awake state. Once these steps are completed, the mobile station may reenter the sleep state and await the page indicator of the next sleep cycle. Those of skill in the art will recognize myriad combinations of search procedures allocated to the first subset and remaining subset, in accordance with the teachings herein. Various example embodiments are detailed below.

Figure 2:
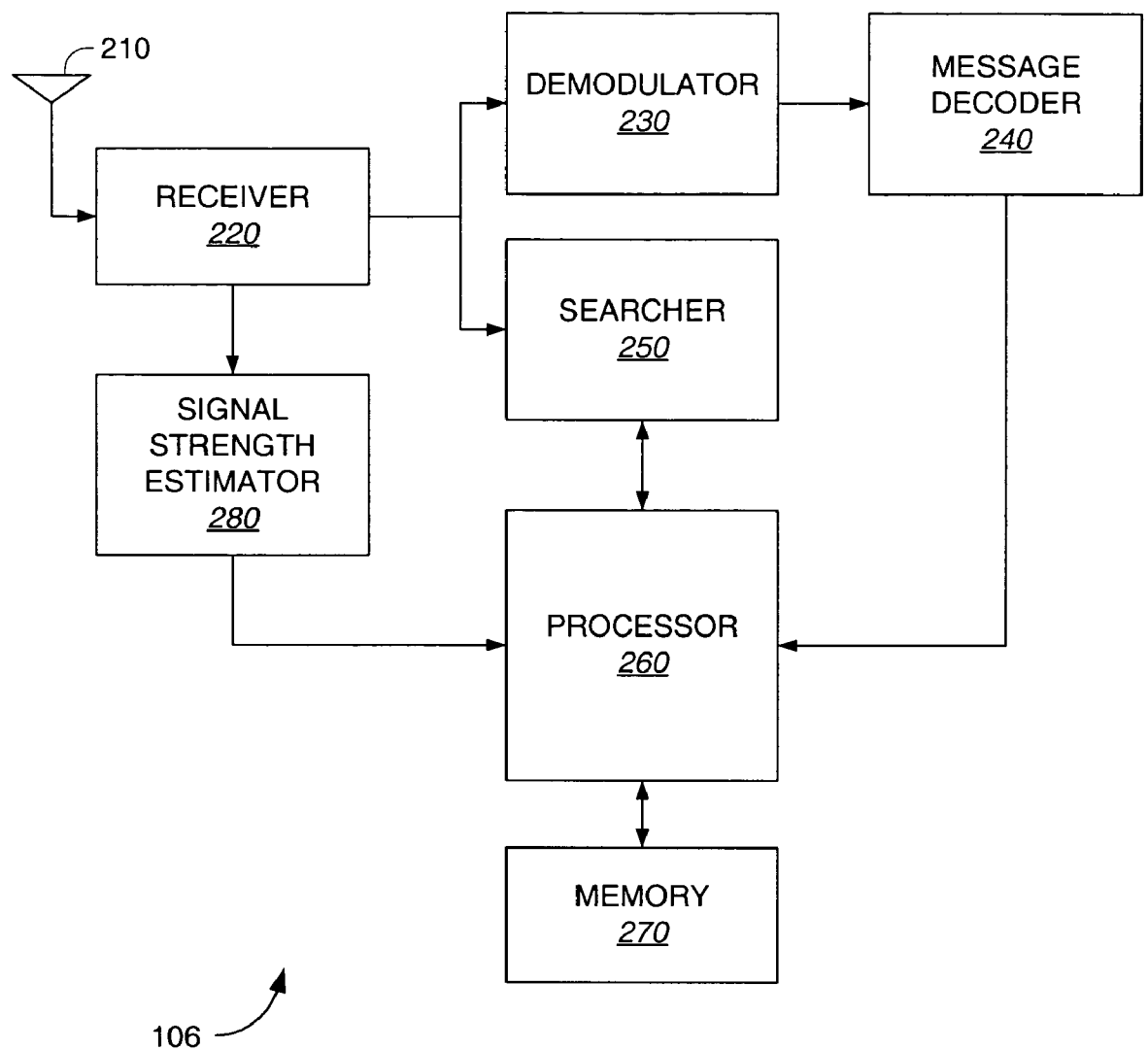
FIG. 2 is a block diagram of a wireless communication device, such as a mobile station.

FIG. 2 depicts a portion of an embodiment of a mobile station 106. Signals are received at antenna 210 and delivered to receiver 220. Receiver 220 performs processing according to one or more wireless system standards, such as the cellular standards listed above. Receiver 220 may perform various processing such as Radio Frequency (RF) to baseband conversion, amplification, analog to digital conversion, filtering, and the like. Various techniques for receiving are known in the art. Note that some or all of the components of receiver 220 may be disabled or put in a low-power state to conserve power while sleeping in idle mode.

The mobile station 106 can communicate with a base station 104 by tuning receiver 220 according to the parameters associated with the base station. Receiver 220 may be directed to periodically tune to an alternate frequency to measure the channel quality of a cell on an alternate frequency, including those on alternate systems. Receiver 220 may be used to measure channel quality of the current serving cell, as well neighbor base stations, although a separate signal strength estimator 280 is shown in FIG. 2 for clarity of discussion (detailed below).

Signals from receiver 220 are demodulated in demodulator 230 according to one or more communication standards. In one example embodiment, a demodulator capable of demodulating W-CDMA and GSM signals is deployed. Additional standards, such as IS-95 or cdma2000, may also be supported in an alternate embodiment. Demodulator 230 may perform RAKE receiving, equalization, combining, deinterleaving, decoding, and various other functions in accordance with the format of the received signals. Various demodulation techniques are known in the art.

Message decoder 240 receives demodulated data and extracts signals or messages directed to the mobile station 106 by the system 100 through one or more base stations 104. Message decoder 240 decodes various messages used in setting up, maintaining and tearing down a call (including voice or data sessions) on a system. Messages may include neighbor cell information. Messages may include various parameters for use in cell selection and reselection, detailed further below. Single bit messages may be supported as well. For example, a page indicator bit included in a Page Indicator Channel (PICH) can be decoded in message decoder 240. Various other message types are known in the art and may be specified in the various communication standards being supported. The messages are delivered to processor 260 for use in subsequent processing. Some or all of the functions of message decoder 240 may be carried out in processor 260, although a discrete block is shown for clarity of discussion.

Signals from receiver 220 are also directed to searcher 250. Searcher 250 may be used to locate various cells available to the mobile station, including the serving cell and neighboring cells. Searcher 250 may be directed by processor 260 to search for cells and to indicate channel quality metrics associated with those cells to processor 260. Search results may be used to direct demodulator 230 to demodulate various signals, as well as for use in cell selection or reselection. Searcher 250 may be deployed to support searching cells of any type of system supported by mobile station 106. Searcher 250 may, upon waking up during a sleep cycle, be directed to search for the previous serving cell, within a certain search window. If the initial search does not successfully locate the serving cell, the search window may be increased, and the search repeated. This process may be iterated any number of times. Examples of other search tasks searcher 250 may be directed to perform include full searches on the serving or alternate frequencies, searching of monitored neighbor cells (both inter- and intra-frequency), and searching other Radio Access Technologies (inter-RAT searching).

Signal strength estimator 280 is connected to receiver 220, and used for making various power level estimates for use in the cell selection or reselection process, as well as for use in various other processing used in communication, such as demodulation. Signal strength estimator 280 is shown as a discrete block for clarity of discussion only. It is common for such a block to be incorporated within another block, such as receiver 220 or demodulator 230. Various types of signal strength estimates can be made, depending on which signal or which system type is being estimated. In an example embodiment, various pilot signals from one or base stations are used for signal strength estimation, examples of which are detailed below. In general, any type of channel quality metric estimation block can be deployed in place of signal strength estimator 280 within the scope of the present invention. The channel quality metrics are delivered to processor 260 for use in cell selection or reselection, as described herein.

Data received may be transmitted to processor 260 for use in voice or data communications, as well as to various other components. A mobile station 106 will generally be equipped with modulation and transmission components for transmitting data to one or more base stations. Additional components for supporting voice communications or data applications are well known in the art and are not shown.

Processor 260 may be a general purpose microprocessor, a digital signal processor (DSP), or a special purpose processor. Processor 260 may perform some or all of the functions of receiver 220, demodulator 230, searcher 250, signal strength estimator 280, message decoder 240, as well as any other processing required by the mobile station. Processor 260 may be connected with special purpose hardware to assist in these tasks (details not shown). Data or voice applications may be external to mobile station 106, such as an externally connected laptop computer, may run on an additional processor within mobile station 106 (not shown), or may run on processor 260 itself. Processor 260 is connected with memory 270, which may be used for storing data as well as instructions for performing the various procedures and methods described herein. Those of skill in the art will recognize that memory 270 may be comprised of one or more memory components of various types, that may be embedded in whole or in part within processor 260.

Figure 3:
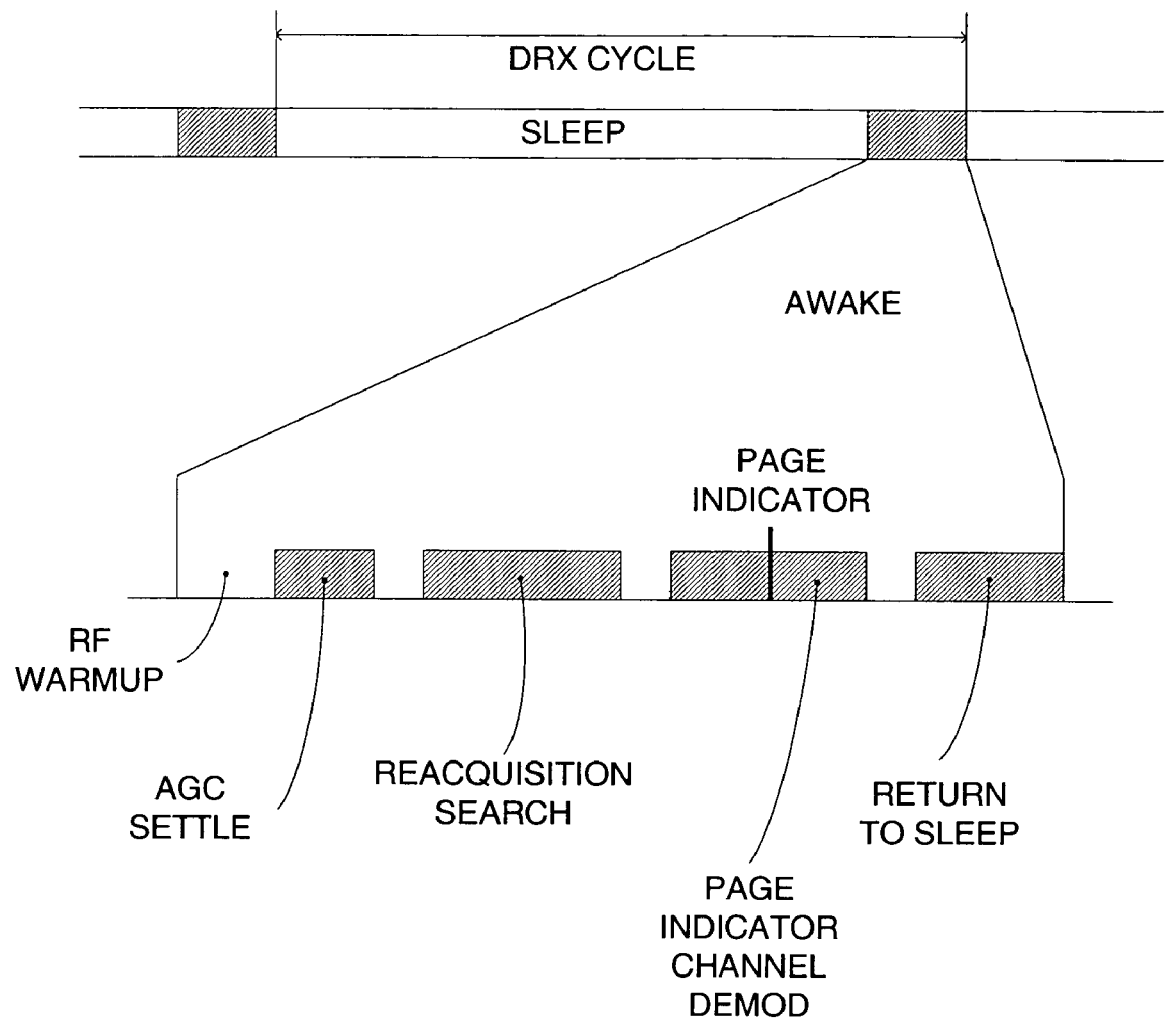
FIG. 3 depicts a simplified timing diagram of an example sleep cycle.

FIG. 3 depicts a simplified timing diagram of an exemplary sleep cycle. In this example, the sleep cycle is a simplified DRX cycle. A DRX cycle is divided into two portions, a low power "sleep" state, and a higher power "awake" state, shown as the shaded portion of the DRX cycle (time durations depicted in FIG. 3 are not drawn to scale). As stated above, it is desirable to minimize the amount of time during each DRX cycle spent in the awake state, so as to minimize overall power consumption, increase standby times, and so forth. The awake portion of the DRX cycle has a magnified detail section shown. Included in the detail section are typical tasks that may need to be performed in the awake portion of a sleep (or idle) mode. The tasks shown are examples only, included for discussion purposes. They form neither an exhaustive nor a minimum list. Various blocks of time are labeled, some of which are shaded. Gaps are shown between shaded blocks to indicate times in which setup tasks for the next block are performed or post-processing from the previous block can take place. Those of skill in the art will recognize that myriad configurations of mobile stations can be deployed, an example of which was detailed above with respect to FIG. 2, and various tasks and instructions to perform waking up, searching, demodulating, and returning to sleep will vary according to the components deployed and which components are activated during the various portions of the cycle.

In this example, the Radio Frequency (RF) components (i.e. receiver 220), shut down during the sleep portion of the DRX cycle, are activated and given time to warm up. Subsequent to RF warmup, a signal, such as an interrupt, can activate one or more processors (i.e. processor 260). A shaded block of time is shown to allow an Automatic Gain Control (AGC) loop to converge and settle. The following gap can be used to prepare the processor and search components (i.e. searcher 250) for reacquisition search. During reacquisition search, an attempt to locate the previous serving cell is made. The precise location of that cell may not be known due to timing drift associated with the sleep portion of the cycle. Changes in the communication channel, such as movement of the mobile station or relative location of obstacles, may also cause variance in the timing of the serving cell. Or, the serving cell may no longer be accessible due to fading or the mobile station moving out of reach. Reacquisition search will be detailed further below with respect to FIGS. 4-5.

In this example, reacquisition search has successfully located the serving cell. The gap following reacquisition search can be used to prepare the mobile station to demodulate the page indicator channel (PICH). For example, finger assignment based on search results can be made, and so forth (i.e. using demodulator 230). The next shaded block indicates PICH demodulation. The thick line shown identifies the page indicator bit associated with the example mobile station. If a page is directed to the mobile station, idle mode will be abandoned and the appropriate active communication will take place. For example, an incoming voice or data call may ensue. When the page indicator indicates no page is directed to the mobile station, the mobile station may return to sleep. The subsequent gap may be used to prepare various components to return to sleep, as shown in the following shaded block. Example steps include shutting down RF circuitry, recording state information, such as serving cell parameters for use in the subsequent DRX cycle, preparing the processor and/or other hardware for sleep, and so forth.

Not shown in FIG. 3, but detailed further below, is the case where reacquisition search does not locate the serving cell in time to receive the page indicator bit. Or, monitored list searching is to be carried out to meet prescribed performance specifications. In either case, the remainder of the awake cycle will be used to perform any additional searching, cell reselection, out-of-service procedures, or the like, as necessary. Subsequent to such processing, the mobile station once again enters the low power sleep state for the next DRX cycle.

Figure 4:
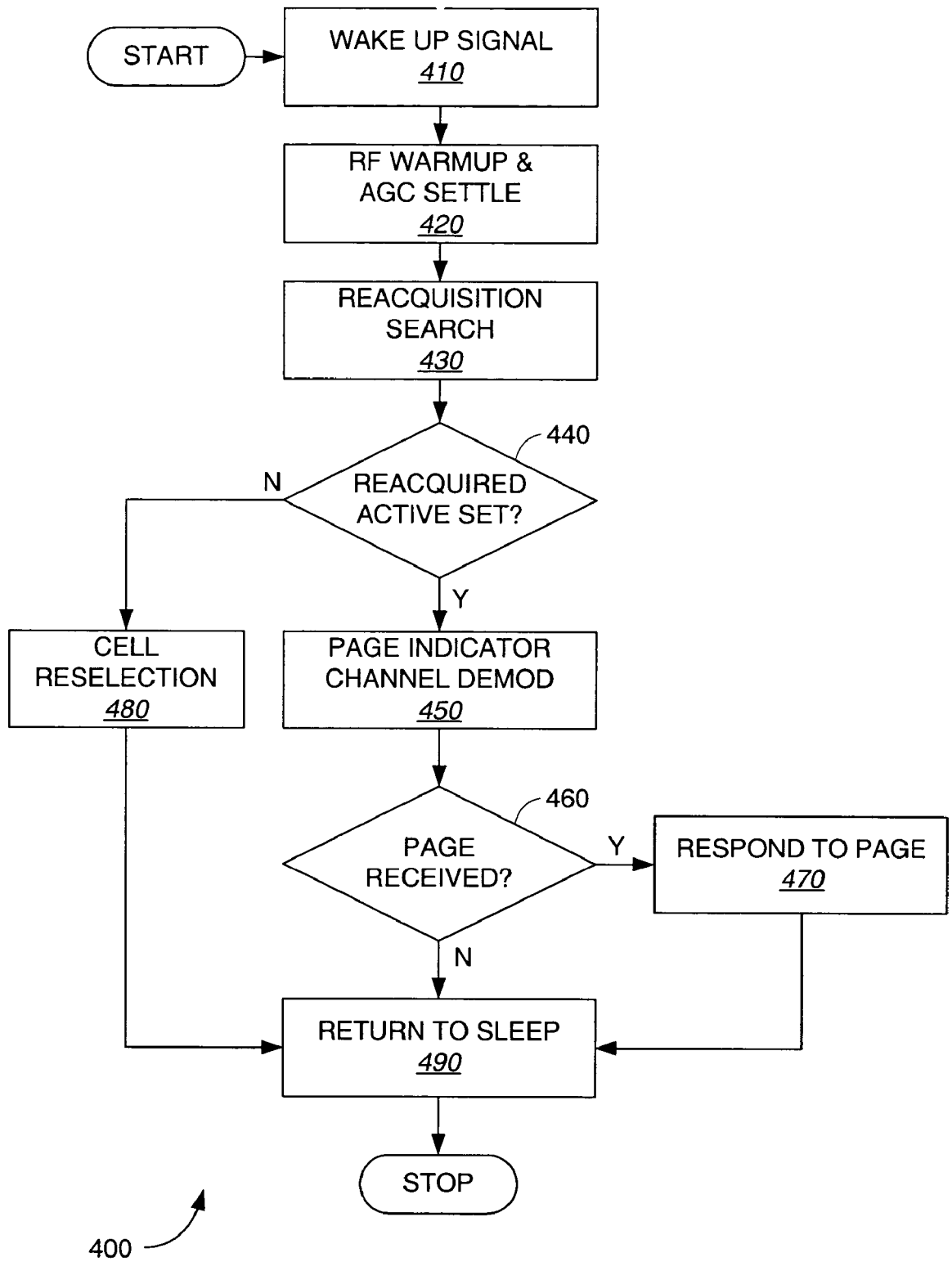
FIG. 4 depicts a flowchart of the wake-up portion of an example sleep cycle.

FIG. 4 depicts an example flowchart 400 of the wake-up portion of a sleep cycle. The process shown is compatible with the timeline depicted in FIG. 3. The various steps described are examples only. Those of skill in the art will readily alter the order, insert or delete steps, or otherwise adapt the teachings herein to various embodiments within the scope of the present invention.

The process begins in step 410. A wake up signal is generated that indicates to one or more portions of the mobile station to exit the low-power, or sleep, state. Note that, although one wake up signal step is shown in FIG. 4, various components may wake up at different times. For example, the RF components may wake up first, to warm up, followed by a processor, to continue operations once the RF circuitry is ready for use. These details are not shown.

In step 420, the RF components warm up, and the AGC circuit is given time to settle. As stated above, steps 410 and 420 are examples only, provided for clarity of discussion.

In step 430, reacquisition search is performed. Reacquisition search is used to attempt to locate the serving cell that was active during the previous cycle, such as a DRX cycle, before the mobile station went to sleep. Example reacquisition search techniques are detailed further below with respect to FIGS. 5-6.

In decision block 440, if the reacquisition search made in step 430 is successful in relocating the previous serving cell, or active set, then proceed to step 450, where the page indicator channel is received and demodulated. If the serving cell is not reacquired in reacquisition search, as determined in decision block 440, or monitored list searching is desired, then some form of cell reselection may be in order, so proceed to step 480. Note that, as described below, a cell may be "acquirable", in that its signal is received with discernable signal strength, strength perhaps even sufficient for communication at a certain level, yet the acquisition is deemed to fail if various criteria are not met. Example criteria are detailed further below. In step 480, perform cell reselection as necessary, then proceed to step 490 and return to sleep for the next DRX cycle. Then the process stops.

In step 450, the page indicator channel is received and demodulated. It is desirable to successfully demodulate the page indicator bit designated for the mobile station. (Note that alternate embodiments may utilize different paging schemes and/or messages. Step 450 may be substituted with a step to perform any type of receiving or demodulation of a signal or message directed to the mobile station to indicate that idle mode should be exited. These alternate embodiments fall within the scope of the present invention.) After demodulating the page indicator channel, proceed to decision block 460.

In decision block 460, if the page indicator channel indicates that a page is received, proceed to step 470. In step 470, the mobile station responds to the page. Any imaginable response to a page can be deployed within the scope of the present invention. A typical example would be that the mobile station is receiving an incoming voice or data call. In this case, the mobile station will exit idle mode and perform whatever active communications are appropriate. When the appropriate response to the page has been made, it may be that the process returns to idle mode (although this is not mandatory, as will be recognized by those of skill in the art.) In this case, the process proceeds to step 490, where the mobile station returns to sleep. Then, as before, the process can stop.

If, in decision block 460, no page is received for the mobile station, then active communication is not necessary. The process proceeds to step 490, where the mobile station returns to sleep, and then the process stops.

Since one object of the present invention is to allow the percentage of the idle or sleep cycle spent awake to be reduced, it may be desirable in various embodiments to time the wake up signal to precede the page indicator bit by the minimum amount of time required to successfully perform reacquisition under certain circumstances (i.e., average search time, etc.). Thus, a mobile station carrying out the process shown can wake up, perform steps necessary to prepare for and attempt reacquisition, then immediately determine if a page is received. In cases where no page is received, and no monitored list searching is desired, the mobile station can quickly return to sleep, thus maximizing the amount of time spent in low-power mode. In such embodiments, when the previous serving cell is not located, there may not be enough time allocated for the mobile station to perform additional searching or cell reselection, before the page indicator bit arrives for that mobile station. However, cell reselection can still be performed. Subsequent to cell reselection, the page indicator bit will not be immediately forthcoming, and the mobile station can return to sleep for the next DRX cycle. The page indicator bit can be rechecked during the active phase of the next DRX cycle, using a process such as that just described with respect to FIG. 4.

In step 490, the mobile station returns to sleep. Preparing to return to sleep may entail saving settings for use in reacquisition during the next DRX cycle, as well as various other tasks known in the art. The step of returning to sleep may be carried out differently depending on the step from which the process arrived at step 490. For example, beginning sleep mode, following active communications, such as may be carried out in step 470, may be different than reentering sleep mode after checking the page indicator bit, as shown in steps 450-460. Cell reselection, as shown in step 480, may also require different steps to be performed before the mobile station enters low power mode. Any conceivable method for reentering sleep mode may be deployed within the scope of the present invention.

Figure 5:
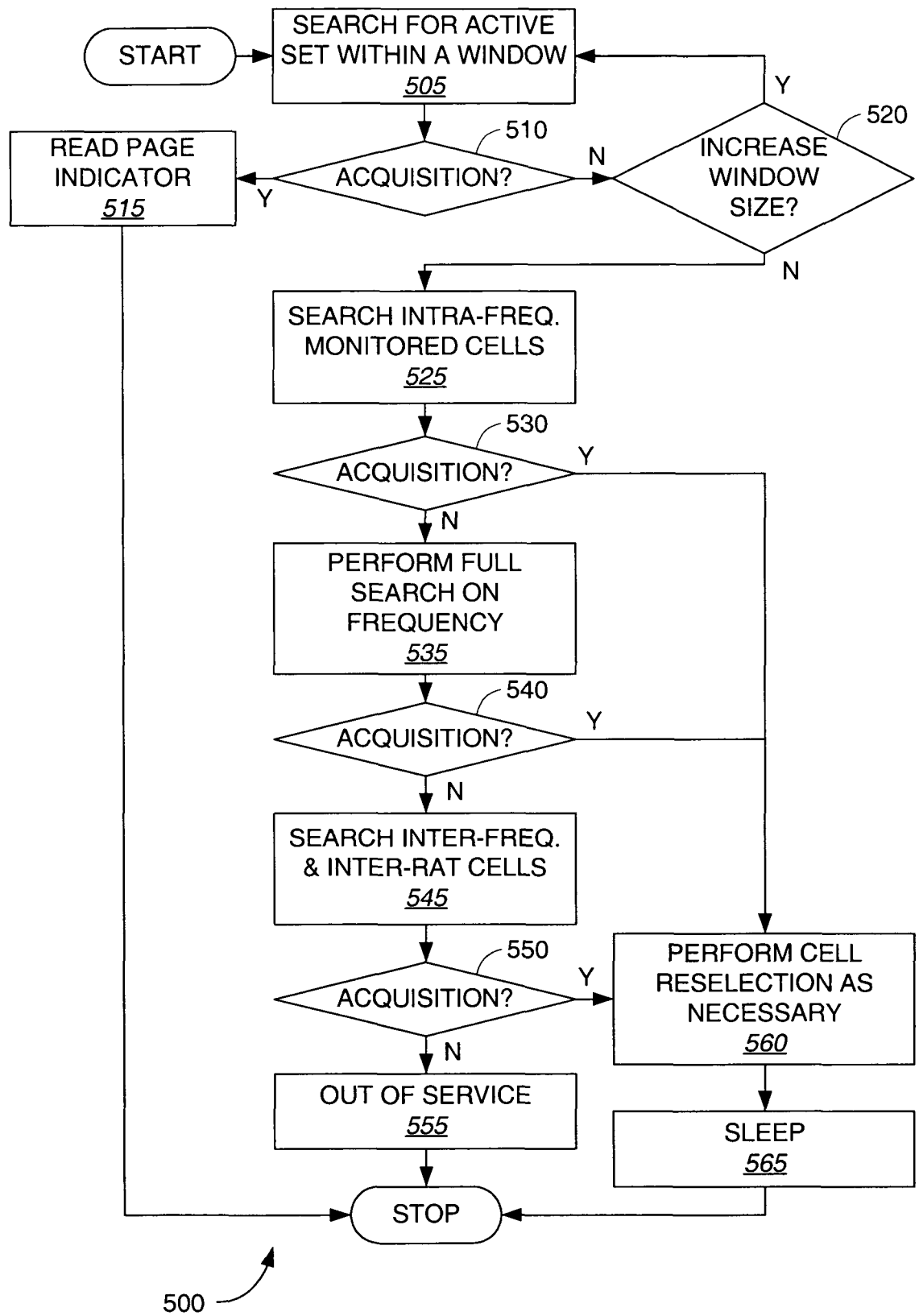
FIG. 5 depicts an embodiment of a reacquisition procedure.

FIG. 5 depicts an embodiment of a reacquisition procedure 500. This example embodiment illustrates various aspects of the invention. Those of skill in the art will recognize that the steps shown in FIG. 5 are neither exhaustive nor required in any particular embodiment. FIG. 5 will be described with reference to a W-CDMA system, but those of skill in the art will readily adapt one or more of the steps shown to various alternate systems, examples of which are disclosed above. This process can be adapted for use as step 430 in FIG. 4, and portions of the process may be carried out as part of steps 450, 480, or 490, among others, as described further below.

The process begins in step 505, where the previous serving cell, or the previous active set, is searched within a predetermined window. The window size may be selected such that the desired cells can be located quickly, accounting for frequency drift or other channel changes within certain expected parameters. Once the window search is performed (for example, using a searcher such as searcher 250), proceed to decision block 510. In decision block 510, if the cell or cells desired are located, acquisition is successful, proceed to step 515. If not, proceed to decision block 520. Various methods and techniques for determining if acquisition is successful are known in the art.

In decision block 520, the window size may be expanded. In any given embodiment, any number of iterative searches over various window sizes can be performed. The window size may be increased, including the previous window, to allow for repeat tests of the previous window in addition to new offsets. Alternatively, a new window that is non-overlapping with or partially overlapping with the previous window can be selected. Of course, the previous window may also be repeated without modification. Furthermore, an embodiment may be deployed with only a single window search to locate the previous serving cell. If an additional window is to be searched, as determined in decision block 520, proceed back to step 505 to perform the next window search. If the number of desired window searches has been exhausted, proceed to step 525.

Step 515 is reached once successful acquisition occurs in any of the iterative window searches, determined in decision block 510. In step 515, the page indicator for the mobile station is read to determine if additional communication is required, or, in the alternative, whether the mobile station can reenter the low-power phase of the sleep cycle. Step 515 may be included as part of step 450, described with respect to FIG. 4, above. Then the reacquisition process can stop.

Step 525 is reached if none of the window searches performed in step 505 have resulted in successful acquisition. In this example, the current frequency is searched for other cells. The current frequency is searched to avoid the need to retune the RF circuitry or other components to another frequency, and any time delay associated with such retuning. In this example, the intra-frequency monitored cells are searched which are contained in the monitored list, described in further detail with respect to FIG. 6, below. Proceed to decision block 530.

In decision block 530, if the intra-frequency search of monitored cells has yielded a successful acquisition, proceed to step 560. If not, proceed to step 535. In step 535, a full search may be performed on the current frequency. Again, the current frequency is searched to avoid retuning to another frequency. Various searching techniques are known in the art, some of which are specific to the type of system deployed, and any such technique can be deployed as the full search in step 535. In a W-CDMA system, for example, a step 1/2/3 search can be deployed, techniques for which are known in the art. After the full search is performed, proceed to decision block 540.

In decision block 540, if the full search resulted in a successful acquisition, proceed to step 560. If not, proceed to step 545. In step 545, various other searches can be performed. Examples include inter-frequency searches and searches of other radio access technologies (inter-RAT searches). Windowed searches for known cells (including iterative searches such as described above) or full searches for any neighboring cell can be searched on one or more alternative frequencies and/or RATs. These example searches may entail the mobile station tuning to alternate frequencies or using differing search techniques applicable to other RATs. For example, a mobile station searching for W-CDMA cells may also search for neighboring GSM cells. Any system technology supported by the mobile station can be searched in step 545. The cells searched in step 545 may be one or more cells from the monitored list, for example. Once the searches are completed, proceed to decision block 550.

In decision block 550, if one or more searches performed in step 545 results in a successful acquisition, proceed to step 560. If not, proceed to step 555. Step 555 may be deployed for situations in which no cell is available to the mobile station, i.e., the mobile station is out of service. Various techniques and procedures for handling out of service conditions are known in the art. The mobile station may perform an alternate acquisition procedure, such as that performed upon initial power-on. Or, the mobile station may return to sleep for one or more DRX cycles to conserve power while awaiting a change in channel conditions such that communication with one or more base stations can be reestablished. This latter example would not require step 555, but step 565, described below, could be entered from decision block 550 when acquisition is unsuccessful (details not shown). Once the out-of-service procedure appropriate for a given embodiment is performed, the process may stop.

In step 560, cell reselection (or idle mode handoff) can be performed to one of the cells identified in step 525, 535, or 545, as applicable. In some cases, cell reselection may not be necessary as the previous serving cell was reacquired during one of those steps (although such acquisition was not successful in step 505). After cell reselection, proceed to step 565 where the mobile station returns to sleep. The example embodiment depicted in FIG. 5 is drawn to indicate the assumption that the page indicator for the current DRX cycle will have already passed if acquisition in step 505 is unsuccessful. Thus, when incorporated with a process such as that depicted in FIG. 4, the time between the wake up signal (step 410) and the arrival of the page indicator is tailored to allow the searching of one or windows (steps 505-520), and no more. As will be apparent to those of skill in the art, alternate embodiments could be deployed to allow time for one or more searches of steps 525, 535, or 545 to be completed, plus reselection, if necessary, prior to arrival of the page indicator. In such alternatives, successful acquisition in decision blocks 530, 540, or 550, respectively, could result in the process proceeding to step 515 for page indicator reading, as described above (details not shown). In any embodiment, once step 565 is reached, the mobile station prepares to return to sleep and may reattempt to read the page indicator during the awake portion of the next DRX cycle. Once the mobile station is prepared for sleep, the process may stop. Note that step 565 may be incorporated with step 490 when the process of FIG. 5 is incorporated with a process such as that described with respect to FIG. 4, above.

Figure 6A:
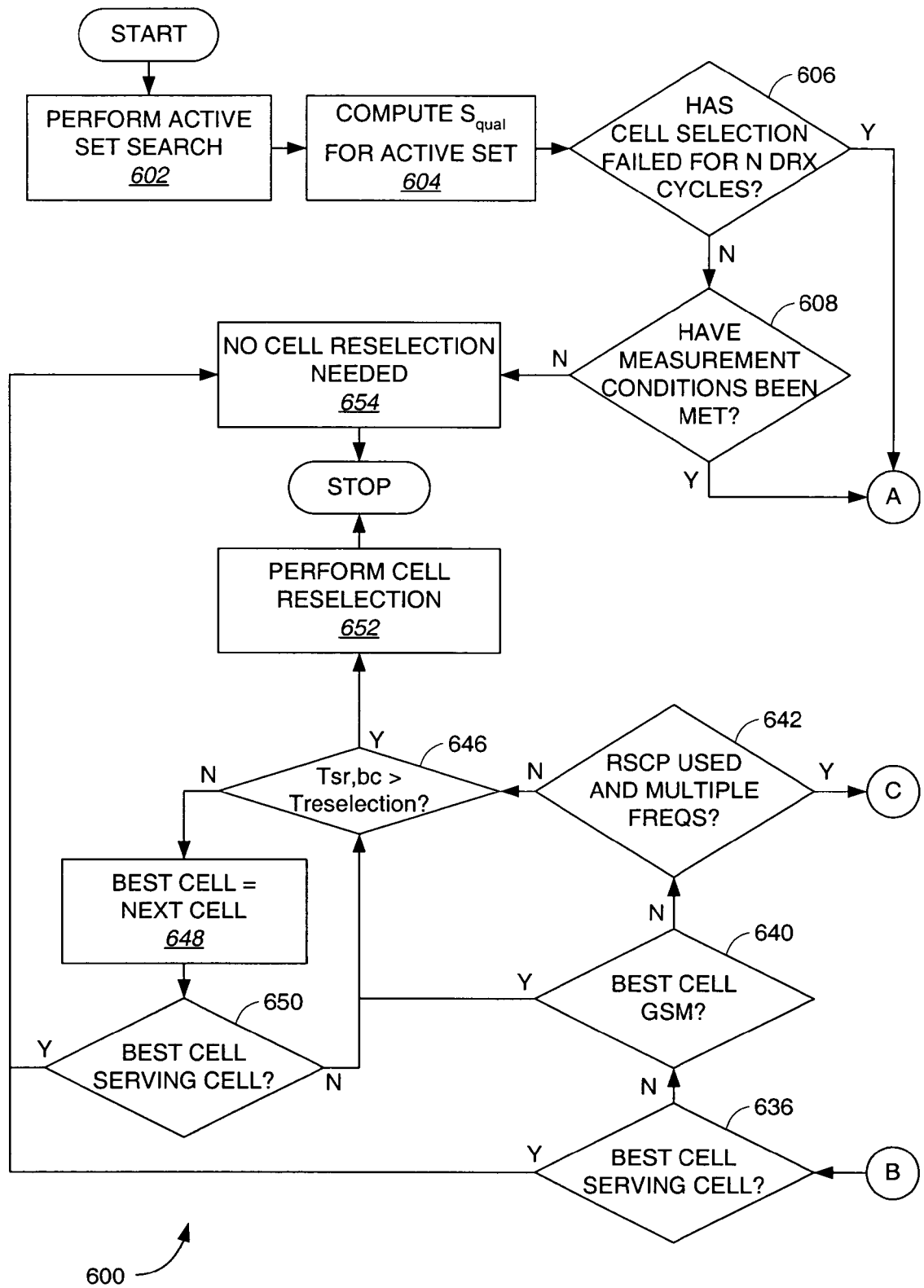
FIG. 6 depicts an example method for performing cell reselection.
Figure 6B:
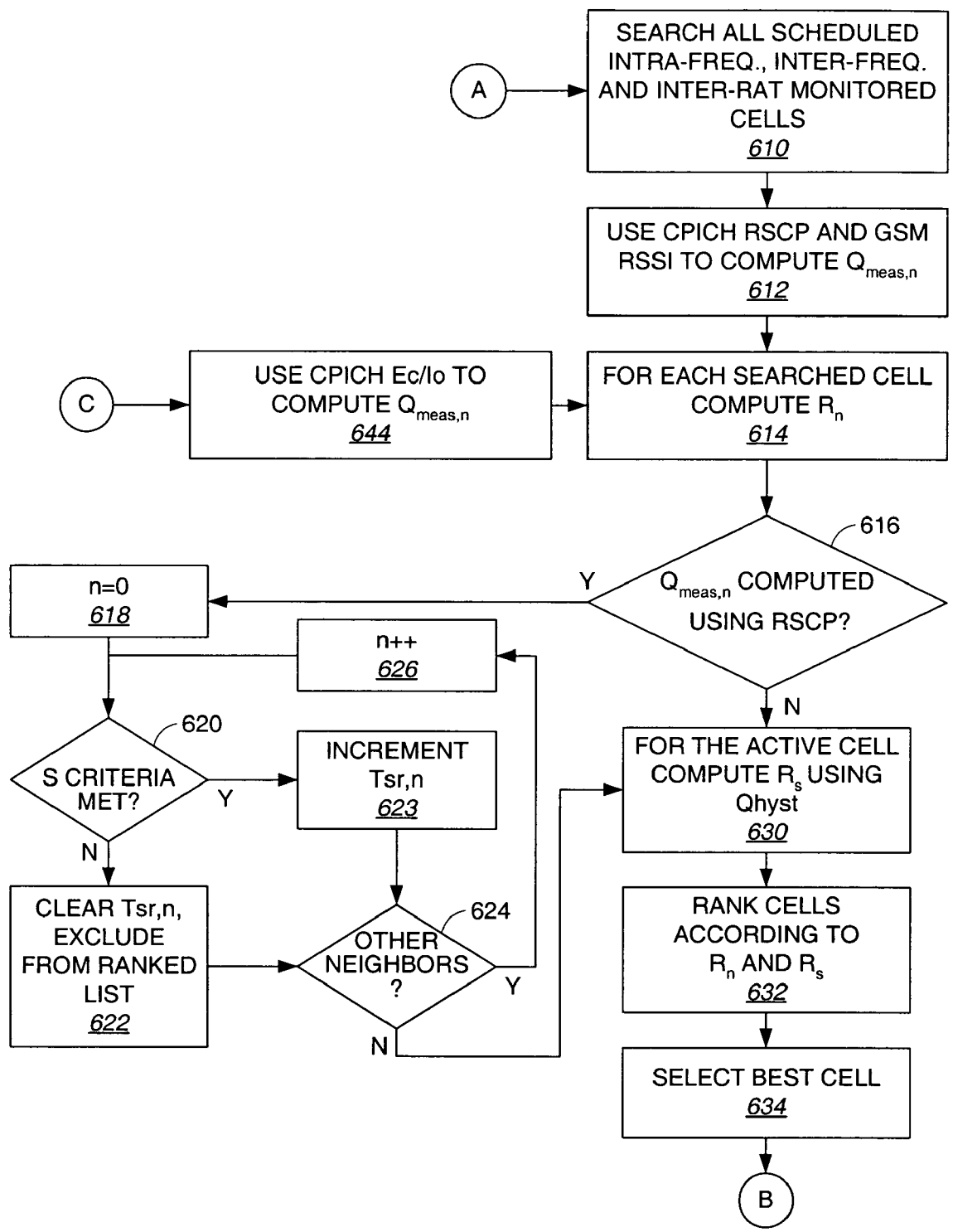

FIG. 6 depicts an example method 600 for performing cell reselection. Cell reselection may be performed when the previous active set or serving cell is not located during reacquisition search, such as described above with respect to steps 480 and 560. In addition, cell reselection may be performed when reacquisition of the serving cell is successful. For example, the W-CDMA standard provides certain requirements for the quality of the received signal of the serving cell. When those quality requirements are not met for a pre-determined number of DRX cycles, cell reselection may be indicated. Furthermore, searching neighbor cells of various types, intra-frequency, inter-frequency, inter-RAT, and so forth, may be prescribed periodically to maintain information about the available neighbor cells. Again, for example, the W-CDMA standard sets forth requirements for performing such searches and maintaining a list of neighbor cells, referred to as the monitored list. The example cell reselection method described below with respect to FIG. 6 includes aspects for limiting unnecessary cell reselection, to minimize time spent in awake mode, thus increasing standby time. Other example techniques are described in co-pending U.S. patent application Ser. No. 10/317,385, entitled "LIMITING CELL RESELECTION BASED ON PILOT POWER", filed Dec. 12, 2002, and assigned to the assignee of the present invention. The methods described with respect to FIG. 6 may be used in conjunction with the methods described in FIGS. 4, 5, 7 and 8, herein, as will be apparent to those of skill in the art, although their use is not required. Similarly, reselection and neighbor search techniques which do not limit cell reselection may also be deployed within the scope of the present invention.

The method described with respect to FIG. 6 is performed once during each DRX cycle in an example embodiment. The mobile station "wakes up" from the low power state during which receiving is deactivated, determines whether cell reselection is in order, in accordance with the method described, performs any additional processing required (such as monitoring the paging channel to determine if an incoming call is being directed to the mobile station), and then reenters the low power state, or "sleeps", for another DRX cycle, if appropriate. The reduction in cell reselections, based on channel information available to the mobile station, allows the mobile station to avoid remaining in the higher-power "awake" state any longer than necessary, thus reducing power consumption and increasing battery life or standby time. At the same time, the mobile station maintains communication with a suitable base station during idle mode, as cell reselection is adapted in response to changing channel conditions experienced by the mobile station.

FIG. 6 depicts an exemplary method 600 of cell selection suitable for mobile stations operable with both W-CDMA and GSM systems, among others. Cell selection and reselection is based on computation of the S criteria, $S_{qual}$ and $S_{rxlev}$, given in equations 1 and 2:

$$S_{qual} = \frac{Ec_p}{I_o} - Q_{qualmin} \tag{1}$$

$$S_{rxlev} = Ec_p - Q_{rxlevmin} - \max(UE\_TXPWR\_MAX\_RACH - P\_MAX, 0) \tag{2}$$

where:
  $Ec_p/I_o$ is the measured CPICH Ec/Io by the searcher (in dB);
  $Q_{qualmin}$ is the minimum required quality level of the cell;
  $Ec_p$ is the measured CPICH Received Signal Code Power (RSCP) (in dBm);
  $Q_{rxlevmin}$ is the minimum required received level in the cell (in dBm);
  UE_TXPWR_MAX_RACH is the max power the UE, or mobile station, may use when transmitting on the Random Access Channel (RACH); and
  P_MAX is the maximum transmit power of the UE, or mobile station.

The W-CDMA standard mandates that the mobile station perform cell selection on the serving cell by computing the S criteria every DRX cycle. The mobile station is expected to monitor the results to ensure that the conditions for cell selection are met. If the cell selection criteria S do not fulfill cell selection requirements for a preset number, N, of consecutive DRX cycles, the mobile station should initiate measurements on the neighbor cells (i.e. the monitored list) and attempt to reselect to another cell, regardless of other rules limiting the mobile station from measuring other cells. The embodiment depicted in FIG. 6 incorporates the W-CDMA standard provisions as well as various aspects of the present invention. The method can be performed during each DRX cycle subsequent to the mobile station coming out of the low power state during which reception was disabled.

The process begins in step 602, where a search is performed to locate and measure the energy of the pilot of the active set. In step 604 compute the S criteria, given in equations 1 and 2 above. In decision block 606, test if cell selection has failed for the current active set. Cell selection fails when the S criteria, $S_{qual}$ and $S_{rxlev}$, are less than zero. In this example, cell selection must fail for N consecutive DRX cycles to initiate a cell reselection. If cell selection has not failed, or has not failed for the requisite N cycles, proceed to decision block 608. If cell selection has failed for N consecutive cycles, proceed to step 610 to begin the reselection process.

In decision block 608, even if cell selection has not failed for N consecutive DRX cycles, as tested in decision block 606, if other criteria are met, the cell reselection process may still be initiated. Any measurement criteria can be deployed for initializing a cell reselection process, as will be recognized by one of skill in the art.

In the exemplary embodiment, three separate types of monitored cells may be scheduled for searching to determine if cell reselection should proceed (described below). If the serving cell's $S_{qual}$, $S_{qual,s}$, falls below the parameter $S_{intrasearch}$ then intra-frequency measurements of monitored cells will be scheduled. $S_{intrasearch}$ may be specified over-the-air by the system. Note that in the exemplary embodiment, a floor is set on $S_{intrasearch}$ by setting it to the maximum of any signaled $S_{intrasearch}$ and $S_{min}$, where $S_{min}$ is computed using the equation for $S_{qual}$ with CPICH $E_c/N_o$ set to −8 dB. If $S_{qual,s}$ falls below the parameter $S_{intersearch}$, then inter-frequency measurements of monitored cells will be scheduled. $S_{intersearch}$ can be signaled over-the-air by the system. If $S_{qual,s}$ falls below the parameter $S_{inter-RAT}$, then alternative Radio Access Technologies (RATs), or inter-RAT measurements of monitored cells will be scheduled. One example inter-RAT search may be to search for neighboring GSM cells, although any alternative system could be scheduled for search within the scope of the present invention. Note that the monitored set need not contain cell types of any particular type. The monitored set may contain any combination of subsets of the three types. It follows that the scheduled set of cells may be a subset of the monitored set, regardless of the satisfaction of the three tests just described. If any of the above criteria are satisfied, then proceed to step 610 to begin the process of determining whether cell reselection will take place, as described below. If none of the above criteria are satisfied, then proceed to step 654, where the Radio Resource Controller (RRC) is signaled that no cell reselection is necessary. The process may then stop.

In step 610, all the scheduled intra-frequency, inter-frequency, and inter-RAT monitored cells are searched. Which cells to search can be determined using the criteria just described with respect to decision block 608. Note further that, if no parameter $S_{intrasearch}$ has been specified by the system, then all intra-frequency cells in the monitored list will be searched. If no parameter $S_{intersearch}$ has been specified by the system, then all inter-frequency cells in the monitored list will be searched. If no parameter $S_{intra-RAT}$ has been specified by the system, then all inter-RAT cells in the monitored list will be searched.

In step 612, the quantity $Q_{meas,n}$ is computed for the n neighbor cells scheduled from the monitored list. $Q_{meas,n}$ is an indicator of the received signal power from each neighbor, and in the example embodiment, it may be computed in two different ways, as described further below. Those of skill in the art will recognize that any power measurement indicator can be used within the scope of the present invention. During this step 612, $Q_{meas,n}$ is an absolute power measurement, measured in dBm, which is useful when comparing results between the serving cell, intra-frequency neighbor cells, inter-frequency neighbor cells, as well as inter-RAT neighbor cells. It is computed as the Received Signal Code Power (RSCP) of the CPICH for W-CDMA cells, and the Received Signal Strength Indicator (RSSI) for GSM cells. RSCP is computed as $E_c/I_o+I_o$, which normalizes the results for varying interference levels across multiple frequencies. Once $Q_{meas,n}$ is computed for all the searched neighbors, proceed to step 614. $Q_{meas,n}$ can alternately be computed as CPICH $E_c/I_o$, measured in dB, which will be detailed below with respect to step 644.

In step 614, for each searched cell, compute a ranking value $R_n$ defined as $Q_{meas,n}$−Qoffset$_n$. Qoffset$_n$ is specified over-the-air by the system, and is set to Qoffset$_n$ when CPICH RSCP or RSSI (for GSM cells) is used to compute $Q_{meas,n}$, as in step 612. Qoffset$_n$ is set to Qoffset$_{2,n}$ when CPICH $E_c/I_o$ is used to compute $Q_{meas,n}$, as in step 644, detailed below. Qoffset$_2$ is specified in dBm for Qoffset$_1$ and in dB for Qoffset$_2$. While use of Qoffset may assist in reducing undesirable cell reselection, particular use of the parameter is not specified by the standard, thus it may not be deployed effectively for limiting cell reselection. Furthermore, it is not responsive to the current state of the communication channel between the serving cell and the mobile station, so it cannot adapt to provide varying levels of cell reselection sensitivity. Proceed to decision block 616.

Decision block 616 provides a branch for the process depending on how step 614 was entered. If $Q_{meas,n}$ was computed using RSCP (or RSSI), as specified in step 612, then proceed to step 618. If not, i.e., step 614 was reached through step 644, proceed to step 630.

In step 618, set n=0. In the loop formed by steps 620-626, n will be used as an index to test the quality of the searched neighbor cells. Proceed to decision block 620, where the S criteria, defined above in equations 1 and 2 are calculated for the n$^{th}$ neighbor. If $S_{qual}$ or $S_{rxlev}$ for the n$^{th}$ neighbor are less than zero, then that neighbor does not meet cell selection criteria. Note that $S_{qual,n}$ is not computed for GSM cells, so the test for $S_{rxlev}$ is used exclusively. Proceed to step 622 and remove the cell from the list of searched neighbor cells. In addition, a timer value Tsr,n is cleared, which is an indicator of how long a cell has met the selection criteria, the use of which is detailed below. If the cell selection criteria is met for the neighbor, proceed to step 623 and increment Tsr.n.

From either step 622 or 623, proceed to decision block 624 to determine if there are any additional neighbors in the list. If so, proceed to step 626, increment n, and return to decision block 620 to test the next neighbor with the cell selection criteria. If not, proceed to step 630.

In step 630, compute the ranking value, $R_s$, for the serving cell. $R_s$ is computed as $Q_{meas,s}$+Qhyst, where $Q_{meas,s}$ is computed for the serving cell using the energy metric used to measure the neighbor cells, i.e., as defined for step 614 or step 644. Qhyst is set to Qhyst1 when the measurement quantity used for ranking is CPICH RSCP, where Qhyst1 can be signaled over-the-air by the system. Qhyst is set to the maximum of Qhyst2 and $H_s$ when the measurement quantity is CPICH $E_c/I_o$. Qhyst2 can be signaled over-the-air by the system. $H_s$ can be computed according to any hysteresis equation, as will be recognized by those skilled in the art. Thus, the system can introduce hysteresis by supplying Qhyst2 over-the-air. However, a floor on the hysteresis value is introduced by $H_s$. Using $H_s$ allows limiting cell reselection in response to changing channel conditions, making reselection less likely when the channel is relatively good, and more likely when the channel is relatively poor. Once the ranking value $R_s$ is computed for the serving cell, proceed to step 632.

In step 632, rank the serving cell and the measured neighbor cells according to their ranking values, $R_s$ and $R_n$. Proceed to step 634 to select the best cell (identified below with subscript bc) as the cell with the highest rank. Proceed to decision block 636.

In decision block 636, if the best cell is the current serving cell, then proceed to step 654, and indicate that no cell reselection is needed, as described above. If the best cell is a cell other than the current serving cell, additional steps are taken to determine whether a cell reselection should take place. Proceed to decision block 640 to begin that portion of the process.

In decision block 640, if the best cell is a GSM cell, proceed to decision block 646. If not, proceed to decision block 642.

In decision block 642, if the prior pass through step 614 used CPICH RSCP for $Q_{meas,n}$, i.e., step 614 was entered from step 612, and there are multiple frequencies in the ranked monitored list, then the list will be re-ranked using CPICH $E_c/I_o$. In this case, the process continues to step 644. If step 644 has already been entered during the process for the current DRX cycle, or there is only one frequency in the ranked list corresponding to the monitored set, then the process continues to decision block 646. Recall that RSCP=$E_c/I_o+I_o$. $I_o$ may be different across different frequencies, so using RSCP normalizes this difference when an absolute power level is desired. If only one frequency is used in the ranked list, then a second pass using $E_c/I_o$ will not alter the ranking generated with RSCP.

In step 644, as mentioned preciously, CPICH RSCP will be used for $Q_{meas,n}$. Proceed to step 614 and re-compute the ranking values $R_n$ for the monitored list (as modified for any cells which failed the cell selection criteria in the loop formed by steps 618-624, described above). Then the process proceeds to decision block 616, where the path to step 630 will be taken since RSCP is no longer the measurement value used for the ranked list. The monitored cells and the serving cell (modified with hysteresis in step 630) will be re-ranked in step 632, and the best cell selection will be made again in step 634. In some cases, a different best cell will prevail, and decision block 636 and possibly decision block 640 will be revisited and performed as described above. If the current serving cell becomes the new best cell, then the process proceeds to step 654, described above, and cell reselection will not be needed. If the same best cell is still selected, or another best cell, different from the current serving cell, is selected, then the process will proceed to step 646. The process may branch through decision block 640 if the best cell is a GSM cell, or through decision block 642 if the best cell is not a GSM cell. The process will not branch from decision block 642 to step 644 during this second pass, as described above.

When the best cell is different than the serving cell, decision block 646 will be reached regardless of whether a second pass was made, or whether or not the best cell is a GSM cell. In decision block 646, Tsr,bc must be greater than the parameter Treselection, which indicates the minimum time a cell must have met cell selection criteria before it can be selected (via the reselection process) as the new current serving cell. Treselection can be transmitted over-the-air from the system. If the minimum time indicated by Treselection has been met by the best cell, proceed to step 652. In step 652, an indication is made to the RRC that cell reselection should be made using the best cell as the new serving cell. Then the process may stop.

If the best cell does not meet the minimum time required for satisfaction of the cell selection criteria, proceed to step 648. In step 648, the next best cell, according to the ranking, is selected. If the next best cell is the current serving cell, no cell reselection is needed, and the process proceeds to step 654, described above, and then terminates. If the next best cell is not the current serving cell, proceed back to decision block 646 to test the minimum time requirement for the next best cell. The loop formed by steps 646-650 will continue until a cell is identified for reselection (and step 652 is reached), or the current cell is selected and no cell reselection is performed (i.e. step 654 is reached).

The embodiments described above with respect to FIGS. 3-6 provide example techniques for waking, searching, reacquisition, reselection, and returning to sleep during idle mode. The principles disclosed herein are suitable for such example embodiments, but may be deployed whenever monitoring cells within a fixed time duration is desired.

Figure 7:
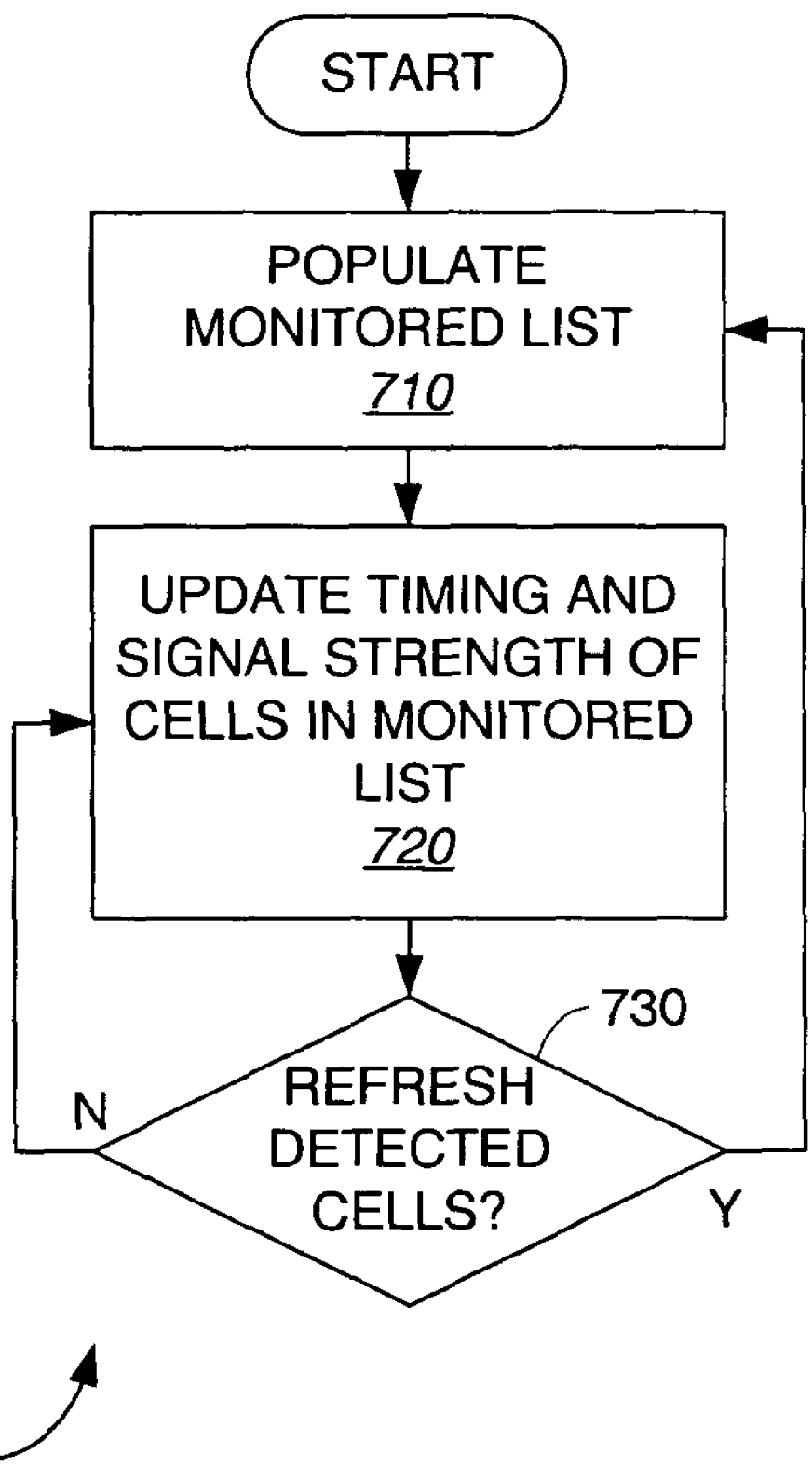
FIG. 7 depicts a generalized method for monitoring neighbor cells.

FIG. 7 depicts a generalized method 700 for monitoring neighbor cells. The process begins in step 710, where a monitored list is generated. The monitored list may be populated using any technique. For example, in a W-CDMA system, a step 1/2/3 search may be performed to locate detectable neighbor base stations, or cells. The mobile station may perform such a search upon power-up, when idle mode is entered, or periodically to maintain a desired refresh rate. The mobile station may populate the monitored list with detected cells during an active communication session. Any such technique, as well as various others known in the art, or combination thereof, may be used to populate the monitored list. The monitored list may be a subset of detectable cells, based on a pre-determined criteria (requiring a minimum received signal strength, for example). Note that the monitored list may comprise intra-frequency, inter-frequency, inter-RAT cells, or any combination thereof.

In step 720, the monitored list is updated. In this example, the timing and signal strength of each candidate in the monitored list is updated by performing a windowed search around the previously detected offset. When the time required to search all the cells in the monitored list exceeds the time allotted for searching, a method for selecting a subset of the monitored list for searching is deployed. An example technique is detailed further below with respect to FIG. 8. A scheme for prioritizing intra-frequency searches, inter-frequency searches, and/or inter-RAT searches may be employed, if desired. The monitored list may be updated periodically. In this example, the monitored list, or a subset thereof, is updated once every DRX cycle. Any rate of updating may be deployed within the scope of the present invention.

Periodically, to meet prescribed performance specifications, for example, the mobile station will refresh the list of detected cells. This is shown in decision block 730. If such a refresh is due, return to step 710 to re-populate the monitored list using the appropriate technique, as described above. Different types of searches may have differing periods between such detected cell refreshing (i.e. detecting inter-frequency or inter-RAT cells may occur less frequently than detecting intra-frequency cells). Examples are described below.

If the current monitored list is not be refreshed, in decision block 730, the mobile station returns to step 720 to update the monitored list periodically. Note that subsets of the monitored list may be updated more or less frequently in step 720. For example, intra-frequency monitored cells may be updated more frequently than inter-frequency or inter-RAT monitored cells.

Figure 8:
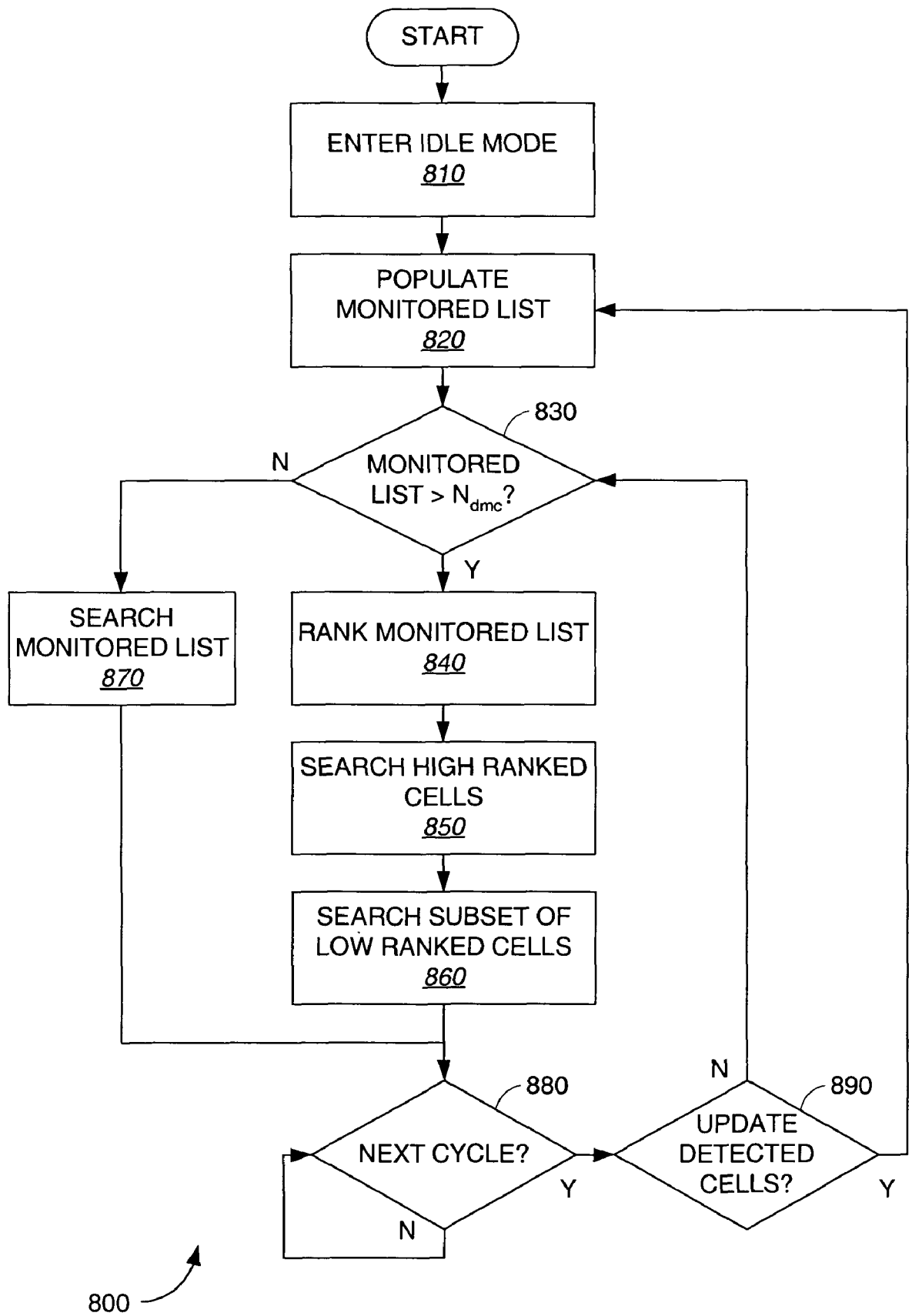
FIG. 8 depicts an example method of updating a monitored list with a fixed time duration for searching.

FIG. 8 depicts an example method 800 of updating a monitored list with a fixed time duration for searching. In this example, the number of searches that may be performed within the fixed time is denoted $N_{dmc}$, where $N_{dmc}$ is the number of detected monitored cells that may be updated during each cycle. In this example, the monitored cell updating is performed each DRX cycle, but any cycle period may be used. Note that steps 830-880 may be used to perform step 720, as described above with respect to FIG. 7.

The process begins in step 810, where the mobile station enters idle mode. Deploying this method in idle mode is used as an example only. In alternate embodiments, a mobile station may perform the remaining portion of method 800 in any other mode as well.

In step 820, the monitored list is populated, using any technique, examples of which are described above with respect to step 710. In the example embodiment, a full search is performed to locate the cells detectable by the mobile station. This search may be repeated on alternate frequencies or radio access technologies as well. In addition, or in the alternative, a search may be performed to locate one or more cells signaled from the base station (i.e., from a transmitted neighbor list message). Various criteria may be employed to qualify a detected cell for inclusion in the monitored list, examples of which are described above. Note that populating the monitored list may include previously detected cells from an active communication session. Furthermore, step 820 may be repeated while method 800 is being performed, so populating the list may comprise updating the previous monitored list using any search technique, examples include a full search or a windowed search of select neighbor cell scrambling codes.

In decision block 830, if the number of cells in the monitored list is less than or equal to $N_{dmc}$, then there will be sufficient time to update each cell in the monitored list. Proceed to step 870 to search and update each cell in the monitored list. If the number of cells in the monitored list is greater than $N_{dmc}$, proceed to step 840.

In step 840, the monitored list is ranked according to search priority. Any ranking method may be deployed. In the example embodiment, the cells are ranked according to decreasing measured signal strength. As shown, the monitored list is re-ranked during each cycle to account for any changes in the received signal strengths as updated. In an alternate embodiment, the re-ranking may be performed during only a subset of the cycles, if reducing the processing required for ranking is desired. A subset of the higher ranked cells is identified. In this example, the number of higher ranked cells, i.e. strong cells, selected is given by $N_{sc}$.

In step 850, the $N_{sc}$ higher ranked cells are searched and updated. In step 860, a subset of the lower ranked cells (chosen based on how old the search results are, for example) are searched and updated. In this example, the number of the lower ranked cells will be given by $N_{dmc}-N_{sc}$. This number will be less than the remaining cells not included in the $N_{sc}$ strongest cells, since the monitored list is greater than $N_{dmc}$. Any technique for selecting the subset of lower ranked cells may be deployed. In the example embodiment, the remaining lower ranked cells will be searched in round-robin fashion (i.e. each cell is included in the subset in order until all the cells have been selected, then the selection begins again at the start of the list), a different subset in each iteration of the loop formed by steps 830-890. Various other techniques will be apparent to those of skill in the art, in light of the teachings herein. For example, the lower ranked cells may be grouped according to signal strength, with the higher signal strength cells updated more frequently in subsequent iterations than lower signal strength cells.

$N_{sc}$ may be fixed, or may be varied in response to any number of criteria. For example, the high ranked cells may be determined by comparing their signal strengths to a threshold. Cells below the threshold may be grouped in the low ranked cells, and those above will be included in the higher ranked cells (if the number of higher ranked cells exceeds a maximum $N_{sc}$ then only the $N_{sc}$ strongest cells may be included). The threshold may be fixed or variable. An example variable threshold may be determined in relation to the strength of the strongest cell. As another example, a minimum number of lower ranked cells may be required for each cycle. Thus, $N_{sc}$ may be set as the difference between $N_{dmc}$ and this minimum. Any number of alternative techniques will be apparent to those of skill in the art in light of the teachings herein.

In decision block 880, the process waits until the next cycle is to begin. In decision block 890, the detected cells may be updated. If so, return to step 820 to repopulate the monitored list. This may include performing a search of any type to locate any new detected cells. Note that cells may also be removed from the monitored list based on some qualifying criteria, examples of which are described above. (In addition, cells may be removed from the monitored list during updating, such as in step 870, 850, or 860, details not shown). If updating the detected cells is not required, return to decision block 830 to perform the next iteration of the loop formed by steps 830-890.

Note that updating detected cells may occur with varying frequency based on the type of search. For example, intra-frequency detected cell updating may be performed at a higher frequency than inter-frequency detected cell updating or inter-RAT updating. Inter-frequency detected cell updating may be performed at a higher frequency than inter-RAT updating. These details are not shown. Those of skill in the art will readily apply these principles to any combination of searching techniques. One or more timers may be included in a mobile station 106 for maintaining the detected cell update rates for one or more search types (details not shown).

Parameters for an example embodiment suitable for incorporation with any of the above described embodiments is detailed as follows. In this example, the mobile station is operating in a W-CDMA system, with the capability of monitoring intra-frequency W-CDMA cells, inter-frequency W-CDMA cells, and inter-RAT cells, which are GSM cells in this example.

Intra-frequency cell updating is performed as follows: Cells in the active set are searched every DRX cycle. In idle mode, the typical active set may include a single cell, although any number of cells may be supported. $N_{dmc}$ detected neighbor cells are searched every DRX cycle when the conditions for measuring monitored cells are met, as described above. An intra-frequency step 1/2/3 search (i.e. full search) is performed every $T_{FS}$ while the mobile station is in idle mode to update the list of detected cells (i.e., as determined in decision block 890). An intra-frequency step 1/2/3 search is also performed the first time idle mode is entered (i.e. step 810). The time, $T_{FS}$, is the time elapsed between successive step 1/2/3 searches on the current serving frequency. A timer (not shown) may be deployed to maintain $T_{FS}$. This timer may be programmed to expire when the strength of the active cell falls below a threshold, Aset_min_ecio. Table 1 gives an example set of parameters for intra-frequency monitored list updating.

TABLE 1

| Parameter | Description | Example Value |
| --- | --- | --- |
| $N_{dmc}$ | Number of detected neighbor cells to be searched every DRX cycle. | 10 for DRX cycles of 5.12 s 5 for all other idle mode DRX cycles |
| $N_{sc}$ | Number of strongest neighbor cells among detected cells to be searched every DRX cycle. | 4 for DRX cycles of 5.12 s 2 for all other idle mode DRX cycles |
| $T_{FS}$ | Number of seconds in between full searches on the serving frequency. | 30 seconds |
| Aset_min_ecio | If active cell CPICH Ec/Io falls below this threshold and no detected monitored cells can be reselected to, the mobile station may perform a full search on the serving frequency right away. | −16 dB Ec/Io |

Inter-frequency cell updating is performed as follows: Some or all of the maximum monitored cells (32 in this example) specified by the network may be configured on different carriers from the serving cell. In the example W-CDMA standard, the mobile station may need to monitor up to 2 additional carriers to measure inter-frequency cells. The mobile station will perform a step 1/2/3 search on each additional carrier to detect and establish timing of detectable inter-frequency monitored cells the first time it enters idle mode operation. The mobile station will search all inter-frequency monitored cells with CPICH Ec/Io within 5 dB of the active cell's CPICH Ec/Io every 5 seconds. The mobile station will search the remaining detected inter-frequency monitored cells every 30 seconds. A step 1/2/3 search will be performed on each additional carrier to detect new monitored cells (i.e. decision block 890) every 60 seconds. Inter-frequency searches are performed subsequent to completion of the scheduled intra-frequency searches in idle mode. This prioritization may be included in determining the selected subsets of high and low ranked cells, described above with respect to steps 840-860 (details not shown in FIG. 8). To minimize frequency switching time, the inter-frequency cells searched in a given cycle may be selected from a single frequency, when possible. Inter-frequency searching may be postponed when a frequency switch would interfere with another mobile station function, such as a pending cell reselection or neighbor cell BCH decoding. The fixed time duration allocated for searching and updating may be determined in accordance with the amount of time required for frequency switching when inter-frequency searching is performed.

Inter-RAT cell (GSM cells, in this example) updating may be performed as follows: If GSM cells are specified in the monitored set and GSM measurement rules have been satisfied, as described above, the mobile station will measure the GSM carrier RSSI of each cell at least once per $T_{measure\text{-}GSM}$. Various performance and search requirements for monitoring inter-RAT GSM cells are detailed in the W-CDMA specification, and are not included herein. These criteria for updating inter-RAT cells, as described with respect to decision block 890, will be readily incorporated by those of skill in the art, in light of the teachings herein.

It should be noted that, in all the embodiments described above, method steps can be interchanged without departing from the scope of the invention. The descriptions disclosed herein have in many cases referred to signals, parameters, and procedures associated with the GSM or W-CDMA standards, but the scope of the present invention is not limited as such. Those of skill in the art will readily apply the principles herein to various other communication systems. These and other modifications will be apparent to those of ordinary skill in the art.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus, comprising:
   a searcher for:
      detecting a plurality of cells to form a ranked list of monitored cells;
      searching each cell from a first list of cells during each of a series of cycles; and
      searching each cell from a subset of a second list of cells during each of the series of cycles; and
   a processor for:
      ranking the list of monitored cells to form a ranked list of monitored cells;
      selecting the first list of cells from the ranked list of monitored cells; and
      selecting the subset of the second list of cells, the second list of cells comprising the remaining cells from the ranked list of monitored cells not selected in the first list of cells, and the selected subset varying during each cycle; and
   wherein:
      the number of cells in the first and second lists for each cycle is determined from strength of a strongest cell from the ranked list of monitored cells.

2. The apparatus of claim 1, wherein:
   the processor further:
      compares the number of cells in the list of monitored cells to a pre-determined search number; and
   wherein:
      the ranking, selecting the first list, and selecting the subset of the second list is performed when the number of cells in the monitored list is greater than the pre-determined search number.

3. The apparatus of claim 2, wherein the processor directs the searcher to search each cell in the list of monitored cells when the number of cells in the monitored list is less than or equal to the pre-determined search number.

4. A method of monitoring neighbor cells, comprising:
   detecting a plurality of cells to form a list of monitored cells;
   ranking the list of monitored cells to form a ranked list of monitored cells;
   searching each cell from a first list of cells selected from the ranked list of monitored cells during each of a series of cycles; and
   searching each cell from a subset selected from a second list of cells during each of the series of cycles, the second list of cells comprising the remaining cells from the ranked list of monitored cells not selected in the first list of cells, and the selected subset varying during each cycle; and
   wherein:
      the number of cells in the first and second lists for each cycle is determined from strength of the strongest cell from the ranked list of monitored cells.

5. The method of claim 4, further comprising:
   comparing the number of cells in the list of monitored cells to a pre-determined search number; and
   wherein the ranking, searching the first list, and searching the subset of the second list is performed when the number of cells in the monitored list is greater than the pre-determined search number.

6. The method of claim 5, further comprising:
   searching each cell in the list of monitored cells when the number of cells in the monitored list is less than or equal to the pre-determined search number.

7. The method of claim 4, wherein each subset selected from the second list is selected in round-robin fashion.

8. The method of claim 4, wherein the cells are ranked in decreasing order of measured signal strength.

9. The method of claim 4, wherein the detecting step is repeated with a minimum frequency according to one or more pre-determined refresh parameters.

10. The method of claim 9, wherein the detecting step comprises one or more search types.

11. The method of claim 10, wherein the detecting step comprises intra-frequency searching.

12. The method of claim 10, wherein the detecting step comprises inter-frequency searching.

13. The method of claim 10, wherein the detecting step comprises inter-radio access technology searching.

14. The method of claim wherein the one or more refresh parameters are associated with the one or more search types.

15. The method of claim 4, wherein the plurality of cells detected comprises intra frequency cells.

16. The method of claim 4, wherein the plurality of cells detected comprises inter-frequency cells.

17. The method of claim 4, wherein the plurality of cells detected comprises inter-radio access technology cells.

18. Processor readable media operable to perform the following steps:
   detecting a plurality of cells to form a list of monitored cells;
   ranking the list of monitored cells to form a ranked list of monitored cells;
   searching each cell from a first list of cells selected from the ranked list of monitored cells during each of a series of cycles; and
   searching each cell from a subset selected from a second list of cells during each of the series of cycles, the second list of cells comprising the remaining cells from the ranked list of monitored cells not selected in the first list of cells, and the selected subset varying during each cycle; and
   wherein:
      the number of cells in the first and second lists for each cycle is determined from strength of a strongest cell from the ranked list of monitored cells.

* * * * *